US007689685B2

(12) United States Patent
Ahmed et al.

(10) Patent No.: US 7,689,685 B2
(45) Date of Patent: Mar. 30, 2010

(54) AUTONOMIC MONITORING FOR WEB HIGH AVAILABILITY

(75) Inventors: Imran Ahmed, Arlington, VA (US);
John J. Auvenshine, Tucson, AZ (US);
Justin Blackburn, Surprise, AZ (US)

(73) Assignee: International Business Machines Corporation, Armonk, NY (US)

( * ) Notice: Subject to any disclaimer, the term of this patent is extended or adjusted under 35 U.S.C. 154(b) by 1521 days.

(21) Appl. No.: 10/672,718

(22) Filed: Sep. 26, 2003

(65) Prior Publication Data

US 2005/0080885 A1    Apr. 14, 2005

(51) Int. Cl.
*G06F 15/173* (2006.01)
(52) U.S. Cl. .................................. 709/224; 709/223
(58) Field of Classification Search ................ 702/188; 709/223, 224
See application file for complete search history.

(56) References Cited

U.S. PATENT DOCUMENTS

| | | | | |
|---|---|---|---|---|
| 5,652,908 A * | 7/1997 | Douglas et al. | ................. | 714/4 |
| 5,822,531 A | 10/1998 | Gorczyca et al. | | |
| 5,892,913 A * | 4/1999 | Adiga et al. | ................. | 709/219 |
| 5,909,547 A * | 6/1999 | Mitra | ........................ | 709/213 |
| 6,115,713 A * | 9/2000 | Pascucci et al. | .............. | 707/10 |
| 6,134,594 A * | 10/2000 | Helland et al. | .............. | 709/229 |
| 6,151,688 A * | 11/2000 | Wipfel et al. | .................. | 714/48 |
| 6,199,018 B1 * | 3/2001 | Quist et al. | .................... | 702/34 |
| 6,243,825 B1 | 6/2001 | Gamache et al. | | |
| 6,389,448 B1 * | 5/2002 | Primak et al. | ............... | 718/105 |
| 6,389,550 B1 | 5/2002 | Carter | | |
| 6,438,705 B1 | 8/2002 | Chao et al. | | |
| 6,446,109 B2 * | 9/2002 | Gupta | ........................ | 709/203 |
| 6,523,036 B1 * | 2/2003 | Hickman et al. | .............. | 707/10 |
| 6,594,786 B1 | 7/2003 | Connelly et al. | | |
| 6,823,382 B2 * | 11/2004 | Stone | ........................ | 709/224 |
| 6,965,938 B1 * | 11/2005 | Beasley et al. | .............. | 709/229 |
| 7,069,267 B2 * | 6/2006 | Spencer, Jr. | .................. | 707/10 |

(Continued)

FOREIGN PATENT DOCUMENTS

WO    WO 03/009157 A1    1/2003

OTHER PUBLICATIONS

Ahrens et al., Evaluating HACMP/6000: A Clustering Solution for High Availability Distributed Systems, 1995 IEEE, pp. 2-9.

*Primary Examiner*—Aaron Strange
(74) *Attorney, Agent, or Firm*—Schmeiser, Olsen & Watts; Anna Linne

(57) ABSTRACT

A method for maintaining a high availability data transmission and processing environment. A network of clusters is provided. Each cluster of the network includes at least two identical servers. Each cluster of the network is directly connected to at least one other cluster of the network. Each pair of clusters directly connected to each other is characterized by each server in a first cluster of the pair of clusters being directly connected to at least one server in a second cluster of the pair of clusters via a communication link. Provided is a control server adapted to monitor an operational status of the communication link (i.e., the communication link is operational or non-operational). The control server is directly linked to at least one server in each cluster via a communication channel between the control server and the at least one server.

33 Claims, 17 Drawing Sheets

U.S. PATENT DOCUMENTS

| | | | |
|---|---|---|---|
| 2002/0035451 A1* | 3/2002 | Rothermel | 703/1 |
| 2002/0078263 A1* | 6/2002 | Darling et al. | 709/331 |
| 2002/0091814 A1 | 7/2002 | Arendt et al. | |
| 2002/0095489 A1 | 7/2002 | Yamagami | |
| 2002/0165952 A1* | 11/2002 | Sewell et al. | 709/224 |
| 2002/0188610 A1* | 12/2002 | Spencer, Jr. | 707/10 |
| 2002/0194319 A1* | 12/2002 | Ritche | 709/223 |
| 2003/0005125 A1 | 1/2003 | Berthaud et al. | |
| 2003/0018927 A1 | 1/2003 | Gadir et al. | |
| 2003/0023669 A1* | 1/2003 | DeLima et al. | 709/203 |
| 2003/0023712 A1 | 1/2003 | Zhao et al. | |
| 2003/0031176 A1 | 2/2003 | Sim | |
| 2003/0036886 A1* | 2/2003 | Stone | 702/188 |
| 2003/0097428 A1* | 5/2003 | Afkhami et al. | 709/220 |
| 2003/0158951 A1* | 8/2003 | Primak et al. | 709/229 |
| 2005/0015431 A1* | 1/2005 | Cherkasova | 709/201 |

* cited by examiner

| COMMUNICATION LINK ID | BETWEEN SERVERS |
|---|---|
| LINK1 | $W_1$ AND $A_1$ |
| LINK2 | $W_1$ AND $A_2$ |
| LINK3 | $W_2$ AND $A_1$ |
| LINK4 | $W_2$ AND $A_2$ |
| LINK5 | $A_1$ AND $D_1$ |
| LINK6 | $A_1$ AND $D_2$ |
| LINK7 | $A_2$ AND $D_1$ |
| LINK8 | $A_2$ AND $D_2$ |

*FIG. 11*

| COMMUNICATION LINK ID | BETWEEN SERVERS |
|---|---|
| LINK1 | $W_1$ AND $A_1$ |
| LINK2 | $W_1$ AND $A_2$ |
| LINK3 | $W_2$ AND $A_1$ |
| LINK4 | $W_2$ AND $A_2$ |

*FIG. 12*

| COMMUNICATION LINK ID | BETWEEN SERVERS |
|---|---|
| LINK5 | $A_1$ AND $D_1$ |
| LINK6 | $A_1$ AND $D_2$ |
| LINK7 | $A_2$ AND $D_1$ |
| LINK8 | $A_2$ AND $D_2$ |

*FIG. 13*

| COMMUNICATION LINK ID | BETWEEN SERVERS |
|---|---|
| LINK1 | $W_1$ AND $A_1$ |
| LINK2 | $W_1$ AND $A_2$ |
| LINK3 | $W_2$ AND $A_1$ |
| LINK4 | $W_2$ AND $A_2$ |
| LINK5 | $A_1$ AND $D_1$ |
| LINK6 | $A_1$ AND $D_2$ |
| LINK7 | $A_2$ AND $D_1$ |
| LINK8 | $A_2$ AND $D_2$ |
| LINK9 | $D_1$ AND $D_2$ |

*FIG. 14*

| COMMUNICATION LINK ID | BETWEEN SERVERS |
|---|---|
| LINK1 | $W_1$ AND $A_1$ |
| LINK2 | $W_1$ AND $A_2$ |
| LINK3 | $W_2$ AND $A_1$ |
| LINK4 | $W_2$ AND $A_2$ |
| LINK5 | $A_1$ AND $D_1$ |
| LINK6 | $A_1$ AND $D_2$ |
| LINK7 | $A_2$ AND $D_1$ |
| LINK9 | $D_1$ AND $D_2$ |

AUTONOMIC MONITORING FOR WEB HIGH AVAILABILITY

BACKGROUND OF THE INVENTION

1. Technical Field

The present invention relates to a system and method for providing a high availability processing environment for entire applications utilizing web services.

2. Related Art

Current systems comprising cluster of identical servers are unable to provide a high availability processing environment with respect to web services for entire applications which are processed by such systems. In effect, such a system at best provides high availability for no more than localized portions of the application rather for the entire application. Accordingly, there is a need for a system and method for providing a high availability processing environment for entire applications utilizing web services.

SUMMARY OF THE INVENTION

The present invention provides a system for maintaining a high availability data processing environment, said system comprising:

a network having a plurality of clusters, each cluster of the network comprising a plurality of identical servers, each cluster of the network being directly connected to at least one other cluster of the network, wherein each pair of clusters directly connected to each other is characterized by each server in a first cluster of the pair of clusters being directly connected to at least one server in a second cluster of the pair of clusters via a communication link; and a control server adapted to monitor an operational status of said communication link, said operational status of the communication link being that said communication link is operational or non-operational, said control server being directly linked to at least one server in each cluster via a communication channel between the control server and the at least one server.

The present invention provides a method for maintaining a high availability data processing environment, said method comprising:

providing a network having a plurality of clusters, each cluster of the network comprising a plurality of identical servers, each cluster of the network being directly connected to at least one other cluster of the network, wherein each pair of clusters directly connected to each other is characterized by each server in a first cluster of the pair of clusters being directly connected to at least one server in a second cluster of the pair of clusters via a communication link; and providing a control server adapted to monitor an operational status of said communication link, said operational status of the communication link being that said communication link is operational or non-operational, said control server being directly linked to at least one server in each cluster via a communication channel between the control server and the at least one server.

The present invention advantageously provides a system and method for providing a high availability processing environment for entire applications utilizing web services.

BRIEF DESCRIPTION OF THE DRAWINGS

FIG. 11 depicts a global dataset associated with the system of FIG. 1, in accordance with embodiments of the present invention.

FIG. 12 depicts a local dataset associated with the web server cluster of the system of FIG. 1, in accordance with embodiments of the present invention.

FIG. 13 depicts a local dataset associated with the application server cluster of the system of FIG. 1, in accordance with embodiments of the present invention.

FIG. 14 depicts a global dataset associated with the system of FIG. 2, in accordance with embodiments of the present invention.

FIG. 15 depicts a global dataset associated with the system of FIG. 3, in accordance with embodiments of the present invention.

DETAILED DESCRIPTION OF THE INVENTION

Figure 1:
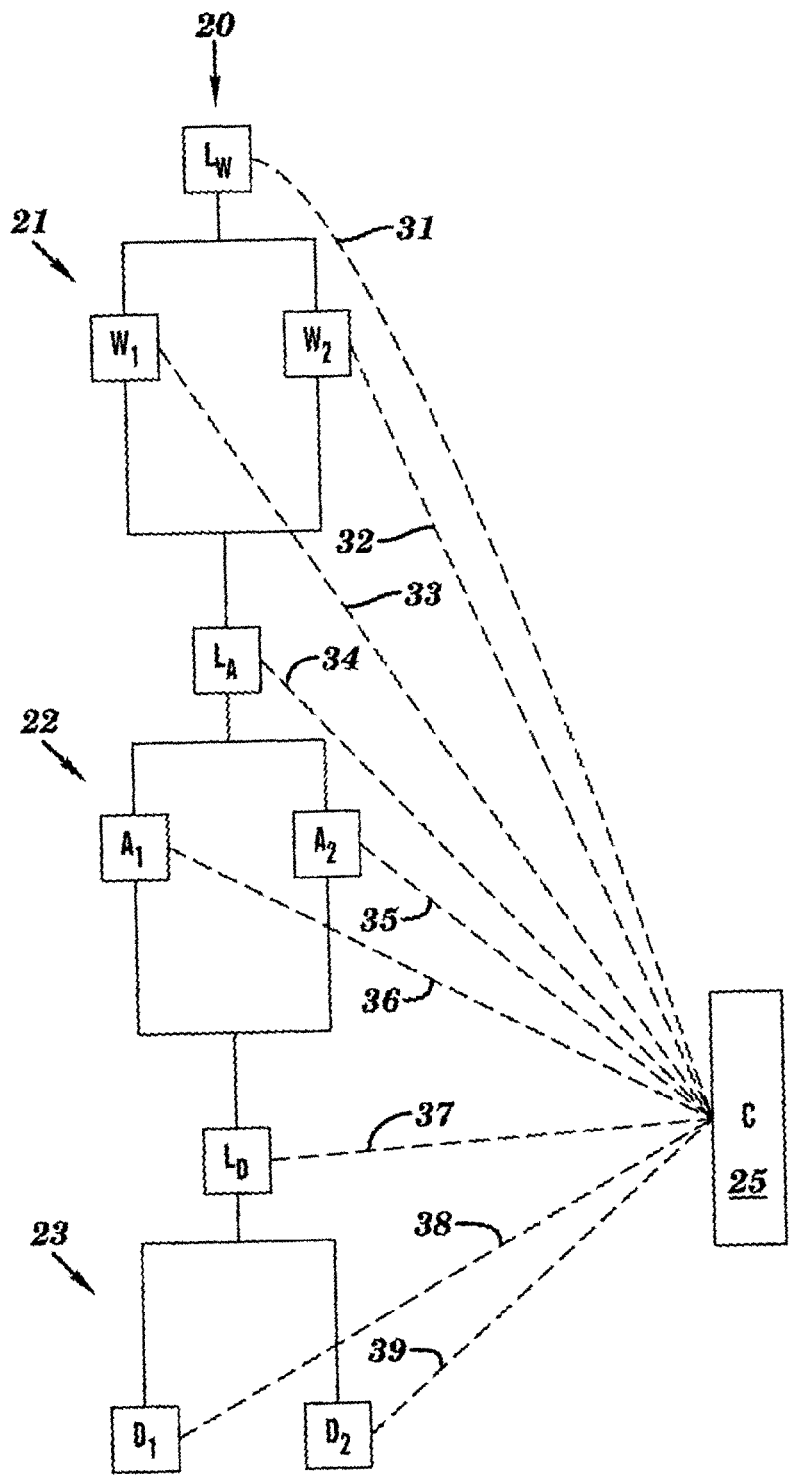
FIG. 1 depicts a system including a control server and a linked network of clusters, the network including a web server cluster coupled to an application server cluster, the application server cluster coupled to a database server cluster, each cluster including a plurality of servers and a load balancer, the control server linked to each server in each cluster, in accordance with embodiments of the present invention.

FIG. 1 depicts a system 20 including a control server (C) 25 and a linked network of clusters, the network including a web server cluster 21 coupled to an application server cluster 22 coupled to a database server cluster 23, each cluster including a plurality of servers and a load balancer, the control server linked to each server in each cluster, in accordance with embodiments of the present invention.

The web server cluster 21 includes identical web servers $W_1$ and $W_2$. While only two such web servers $W_1$ and $W_2$ are shown in the web server cluster 21 of FIG. 1, the web server cluster 21 generally includes two or more of such identical web servers. A load balancer $L_W$ is adapted to distribute data traffic uniformly among the web servers (e.g., $W_1$ and $W_2$) of the web server cluster 21. Such data traffic may originate from web browsers (not shown) requesting documents or web pages from the web server cluster 21.

Definitionally, a web server is software that serves files in response to requests from web browsers (or other requesting software). When the web server receives a request for a static HTML (i.e., HyperText Markup Language) page, the server reads the request, finds the page, and sends it to the requesting browser (or other requesting software). Common web servers include Microsoft IIS, Netscape Enterprise Server®, Java WebServer, and Apache HTTP Server. The web server may communicate with database servers to access the information needed to be served to the requesting web browser. Such communication between a web server and a database server is direct when a static HTML page is requested by the web browser, as exemplified in FIGS. 5-7 which will be discussed infra.

However, the web browser (or other requesting software) may request dynamic web content, such as web content that includes dynamic data provided by a user who is using the web browser to obtain the requested web content. Such a need for dynamic content would occur in web sales applications, personalized web advertising applications, streaming video applications, etc. Applications that require dynamic web content, cannot execute with the simpler model of a web server directly connected to a database server. Instead, an application server functioning as intermediary software between the web server and the database server is required. An application server may handle dynamic content by inserting strings of code into HTML. Examples of application servers includes IBM Websphere, Sun Java Web Server, etc.

Returning to FIG. 1, the application server cluster 22 includes identical application servers $A_1$ and $A_2$. While only two such application servers $A_1$ and $A_2$ are shown in the application server cluster 22 of FIG. 1, the application server cluster 22 generally includes two or more of such identical application servers. A load balancer $L_A$ is adapted to distribute data traffic uniformly among the application servers (e.g., $A_1$ and $A_2$) of the application server cluster 22. Such data traffic may originate from web server cluster 21.

In FIG. 1, the database server cluster 23 includes identical database servers $D_1$ and $D_2$. While only two such database servers $D_1$ and $D_2$ are shown in the database server cluster 23 of FIG. 1, the database server cluster 23 generally includes two or more of such identical database servers. A load balancer $L_D$ is adapted to distribute data traffic uniformly among the database servers (e.g., $D_1$ and $D_2$) of the database server cluster 23. Such data traffic may originate from application server cluster 22.

Definitionally, a database server is software that serves information stored in one or more databases to requesting software, such as to an application server that requests said information (e.g. application server $A_1$ or $A_2$ of FIG. 1) or to a web server that requests said information (e.g., web server $W_1$ or $W_2$ of FIG. 5 which will be discussed infra).

In FIG. 1, the web server cluster 21 is directly connected to the application server cluster 22, the application server cluster 22 is directly connected to the database server cluster 23, and the web server cluster 21 is indirectly connected to the database server cluster 23. The definition of "directly connected" and "indirectly connected", as applied to clusters and servers herein including in the claims, is presented next.

Figure 9:
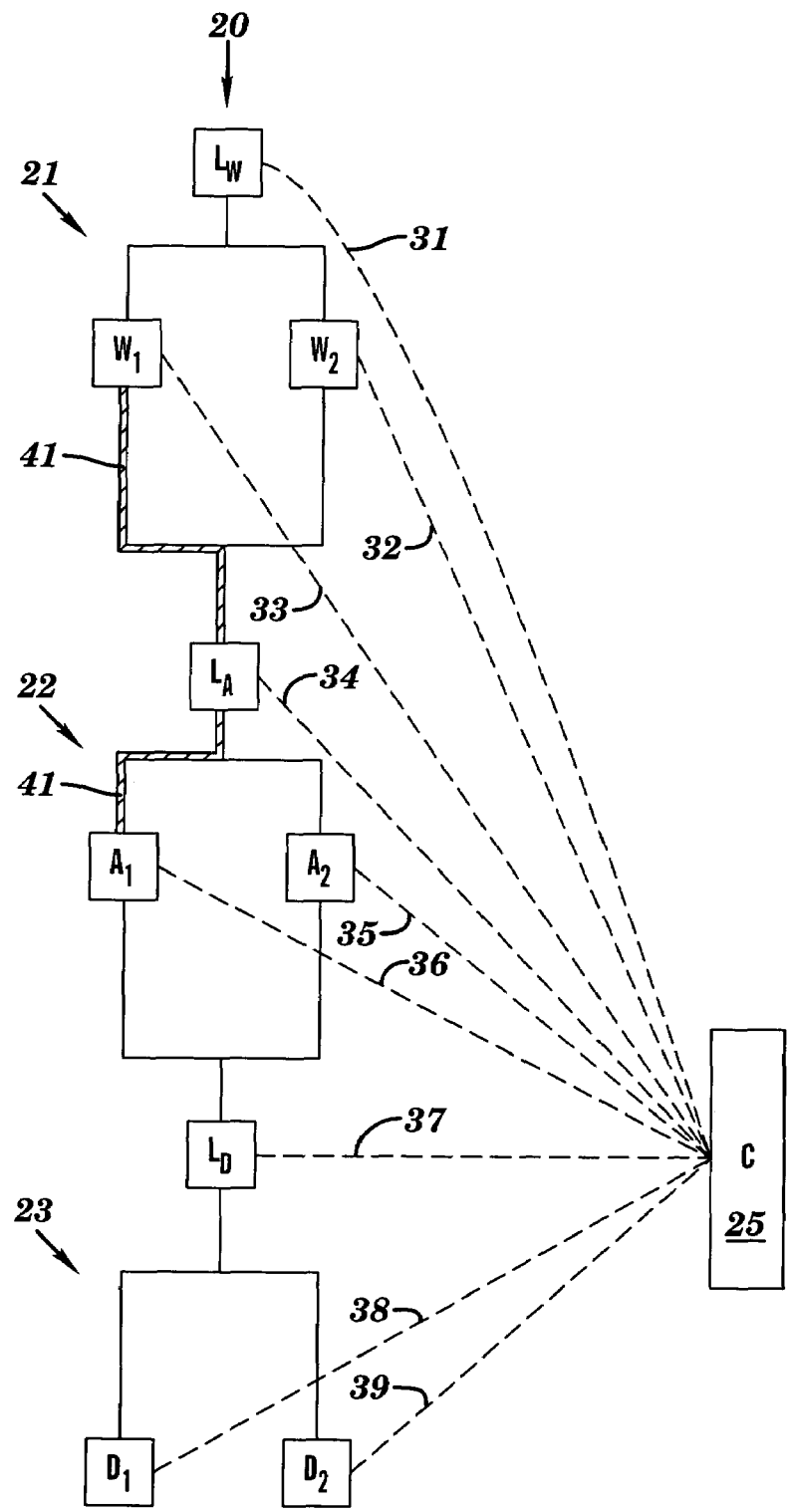
FIG. 9 depicts FIG. 1 to illustrate a communication link between a first web server of the web server cluster and a first application server of the application server cluster, in accordance with embodiments of the present invention.

Two clusters, denoted as a first cluster and a second cluster in a system of clusters such as, inter alia, the system 20 of FIG. 1, are directly connected to each other as a matter of definition if a server S1 of the first cluster and a server S2 of the second cluster are directly connected to each other. The servers S1 and S2 are directly connected to each other as a matter of definition if the communication link that connects S1 and S2 does not include any server that intervenes between S1 and S2. Inclusion of the load balancer of the first or second cluster in said communication link does not negate a direct connection between S1 and S2. The concept of a "communication link" between two such servers is specifically illustrated in FIGS. 9 and 10. FIG. 9 depicts FIG. 1 to illustrate a communication link between a first web server of the web server cluster and a first application server of the application server cluster, in accordance with embodiments of the present invention.

FIG. 9 depicts FIG. 1 to illustrate a communication link 41 that directly connects web server $W_1$ of cluster 21 with application server $A_1$ of cluster 22, in accordance with embodiments of the present invention. Since there is no server on communication link 41, web server $W_1$ is directly connected to application server $A_1$, in accordance with the definition, stated supra of "directly connected." Note that the load balancer $L_A$ existing on the communication link 41 does not negate the direct connection between web server $W_1$ and application server $A_1$ In addition, cluster 21 is directly connected to cluster 22, since web server $W_1$ is directly connected to application server $A_1$. The communication link 41, as well as the communication links 42 and 43 in FIG. 10, may represent any known communication link such as, inter alia, the Internet, an intranet, cable, telephone wiring, hard wiring such as within a computer system, optical fibers, etc.

Figure 10:
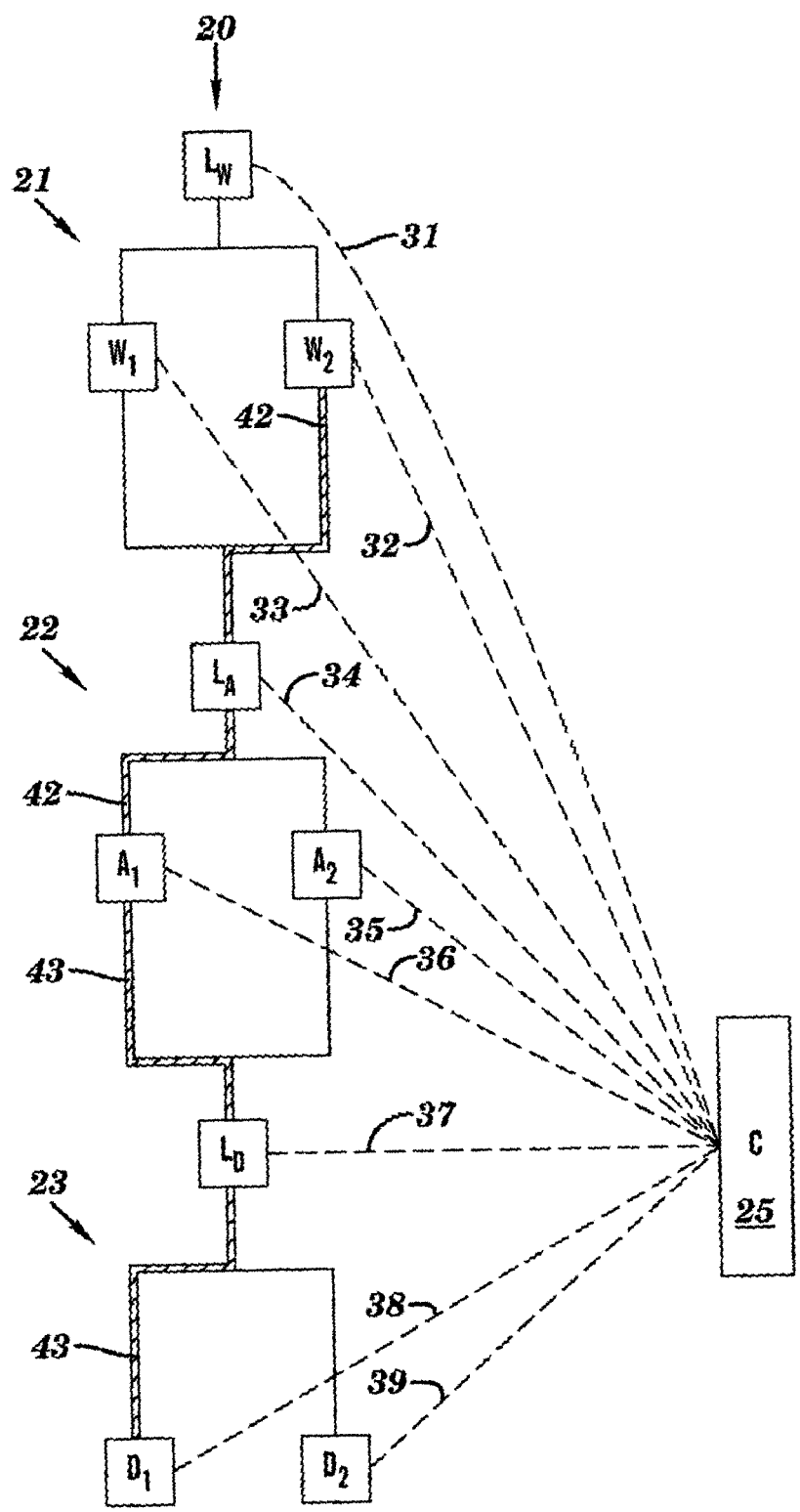
FIG. 10 depicts FIG. 1 to illustrate a communication link between a second web server of the web server cluster and a first application server of the application server cluster and a communication link between the first application server of the application server cluster and a first database server of the database server cluster, in accordance with embodiments of the present invention.

FIG. 10 depicts FIG. 1 to illustrate a communication link 42 that directly connects web server $W_2$ of cluster 21 with application server $A_1$ of cluster 22, in accordance with embodiments of the present invention. Since there is no server on communication link 42, web server $W_2$ is directly connected to application server $A_1$, in accordance with the definition, stated supra of "directly connected." Note that the load balancer $L_A$ existing on the communication link 42 does not negate the direct connection between web server $W_2$ and application server $A_1$. In addition, cluster 21 is directly connected to cluster 22, since web server $W_2$ is directly connected to application server $A_1$.

FIG. 10 also illustrates a communication link 43 that directly connects application server $A_1$ with database server $D_1$. The serial combination of communication links 42 and 43 is a composite communication link that indirectly connects web server $W_2$ with database server $D_1$. Said composite communication link indirectly, rather than directly, connects web server $W_2$ with database server $D_1$ because said composite communication link includes server $A_1$ which intervenes between web server $W_2$ and database server $D_1$.

Returning to FIG. 1, the preceding discussion clarifies why the web server cluster 21 is directly connected to the application server cluster 22, the application server cluster 22 directly connected to the database server cluster 23, and the web server cluster 21 is indirectly connected to the database server cluster 23.

In FIG. 1, the control server 25 is software that is linked to the load balancers and servers as follows. Control server 25 is linked to the load balancers $L_W$, $L_A$, and $L_D$ over communication channels 31, 34, and 37, respectively. Control server 25 is linked to servers $W_1$, $W_2$, $A_1$, $A_2$, $D_1$, and $D_2$, over communication channels 32, 33, 35, 36, 38, and 39, respectively. The communication channels 31-39 may represent any known communication channel such as, inter alia, the Internet, an intranet, cable, telephone wiring, hard wiring such as within a computer system, optical fibers, etc.

To understand the functionality of the control server 25, consider an application in which a browser under direction from a user requests dynamic content (e.g., a dynamic web page) from the web server cluster 21. The request is processed by the load balancer $L_W$ of the web server cluster 21, which attempts to distribute data traffic uniformly among the web servers therein (i.e., $W_1$ and $W_2$). The request is transmitted via $W_1$ and/or $W_2$ to the load balancer $L_A$ of the application server cluster 22, which attempts to distribute data traffic uniformly among the application servers therein (i.e., $A_1$ and $A_2$). Next, application servers $A_1$ and/or $A_2$ attempt to obtain the requested information by having the database cluster 23 access the requested information from the pertinent database(s). The load balancer $L_D$ attempts to distribute data traffic uniformly among the database servers therein (i.e., $D_1$ and $D_2$). After being retrieved from the pertinent database(s), the requested information is provided to the application servers $A_1$ and/or $A_2$ which manipulate and reorganize the requested information to generate the requested dynamic content. The generated dynamic content is passed back to the web servers $W_1$ and/or $W_2$ and subsequently to the requesting web browser and user.

Note that the clusters 21, 22, and 23 process may process applications concurrently, so that the functionality of the load balancers $L_W$, $L_A$, and $L_D$ of distributing data traffic uniformly among the included servers is important for processing said applications at high efficiency. Said applications may execute at optimum efficiency if all servers in clusters 21, 22, and 23 are fully operational (i.e., functioning normally). If a server becomes non-operational, however, efficiency may be degraded and it is important to minimize the loss of efficiency resulting from a server becoming non-operational. Each load balancer may periodically test the operational status of each server within its cluster by sending a prompt signal to each server in the expectation of receiving a return signal responsive to the prompt signal. The operational status of a server is that the server is operational (i.e., working correctly) or non-operational (i.e., working incorrectly or not working). The return signal or absence thereof is indicative of the operational status of each said server. If the load balancer determines that a server in its cluster is non-operational, then the server is adapted to "fail over" the non-operational server (i.e., remove the non-operational server from being available to receive and process data traffic coming into the cluster) and attempt to distribute data traffic uniformly among the remaining servers in the clusters.

Although the preceding functionality of the load balancers $L_W$, $L_A$, and $L_D$ is beneficial, said load balancers do not facilitate optimizing the processing of the entire application because the load balancer and servers of a given cluster are not apprised of non-functioning servers of other clusters. Accordingly, the load balancer and servers of the given cluster cannot adjust their processing of applications in a way that takes account the non-operational status of one or more servers in another cluster. For example, if it were possible for the load balancer and servers of the web server cluster 21 to learn that one or more application servers of application cluster 22 have become non-operational, then the web sever cluster 21 would be able to reduce the number of concurrent requests made for the services of application cluster 22 and instead divert some or all of its applications to another fully operational application server cluster until such time that all clusters of application cluster 22 have become fully operational. Unfortunately, current load balancers do not have knowledge that one or more servers of another cluster have become non-operational. The control server 25 of the present invention solves this problem by communicating with the servers and load balancers of the system 20, as will be explained infra in conjunction with FIGS. 16-19.

Figure 2:
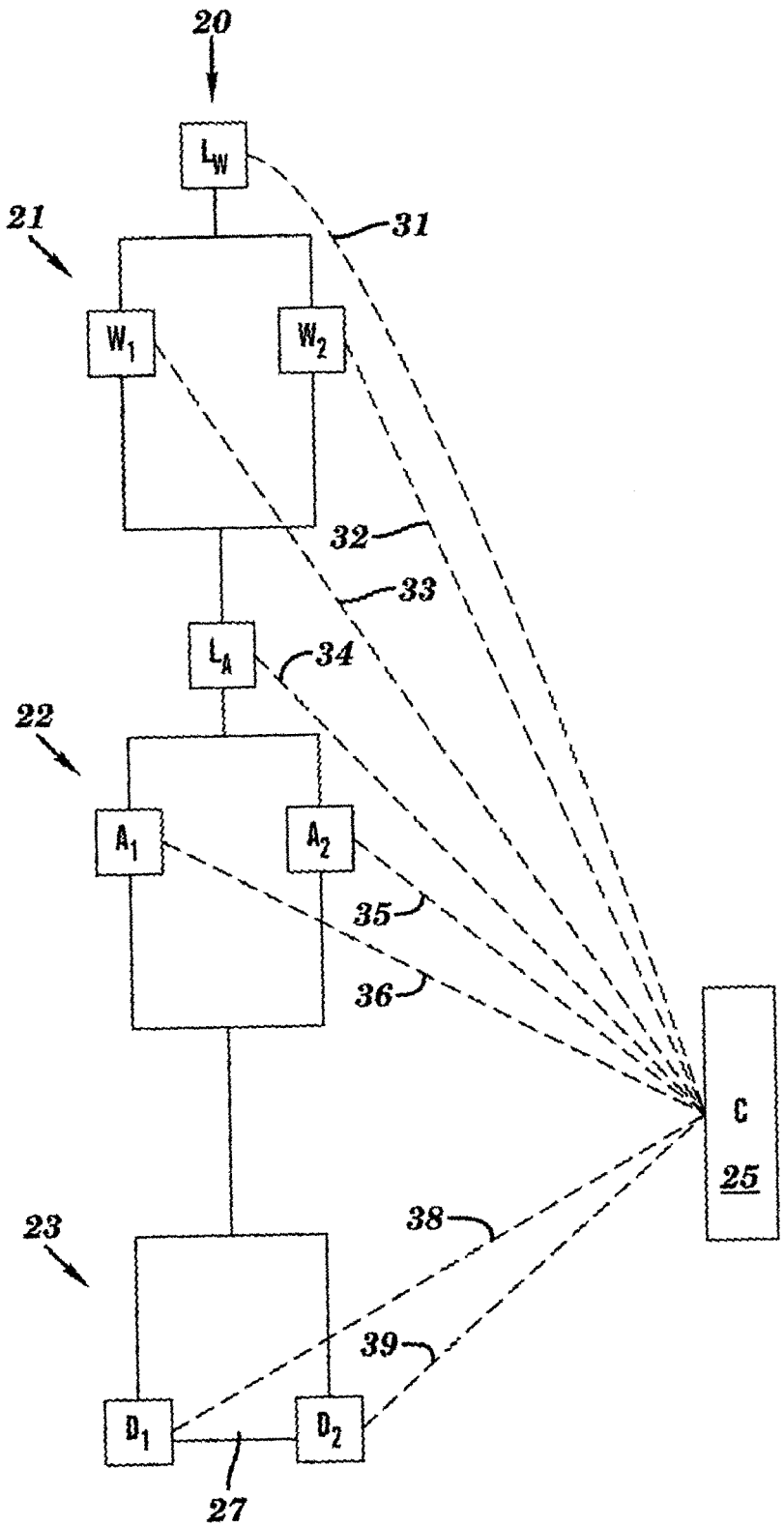
FIG. 2 depicts FIG. 1 after removal of the load balancer of the database server cluster, in accordance with embodiments of the present invention.
Figure 4:
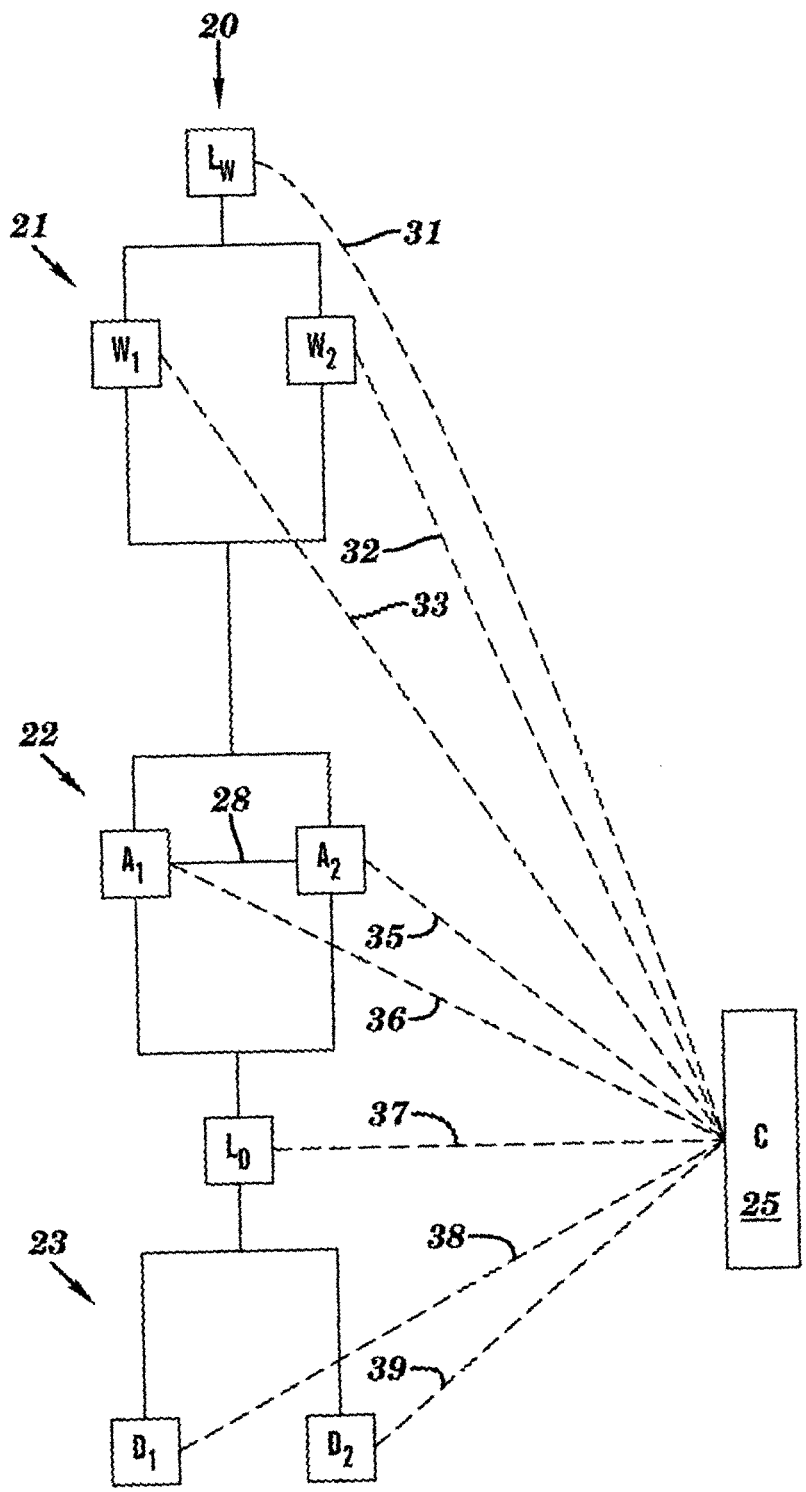
FIG. 4 depicts FIG. 1 after removal of the load balancer of the application server cluster, in accordance with embodiments of the present invention.

FIG. 2 depicts FIG. 1 after removal of the load balancer $L_D$ of the database server cluster 23, in accordance with embodiments of the present invention. FIG. 2 illustrates that a cluster could exist without a load balancer. When a load balancer is absent, the functionality of the load balancer may be simulated in another manner. In FIG. 2, for example, a communication link 27 connecting database servers $D_1$ and $D_2$ enables $D_1$ and $D_2$ to communicate with each other and pass data to and from each other in order to distribute data traffic uniformly between $D_1$ and $D_2$, or generally between the database servers of the database server cluster 23. In a similar manner, any cluster of the system could function without a load balancer and still balance data traffic among the servers of the cluster. As another example, FIG. 4 depicts FIG. 1 after removal of the load balancer $L_A$ of the application server cluster 22 with addition of a communication link 28 connecting application servers $A_1$ and $A_2$, in accordance with embodiments of the present invention.

Figure 3:
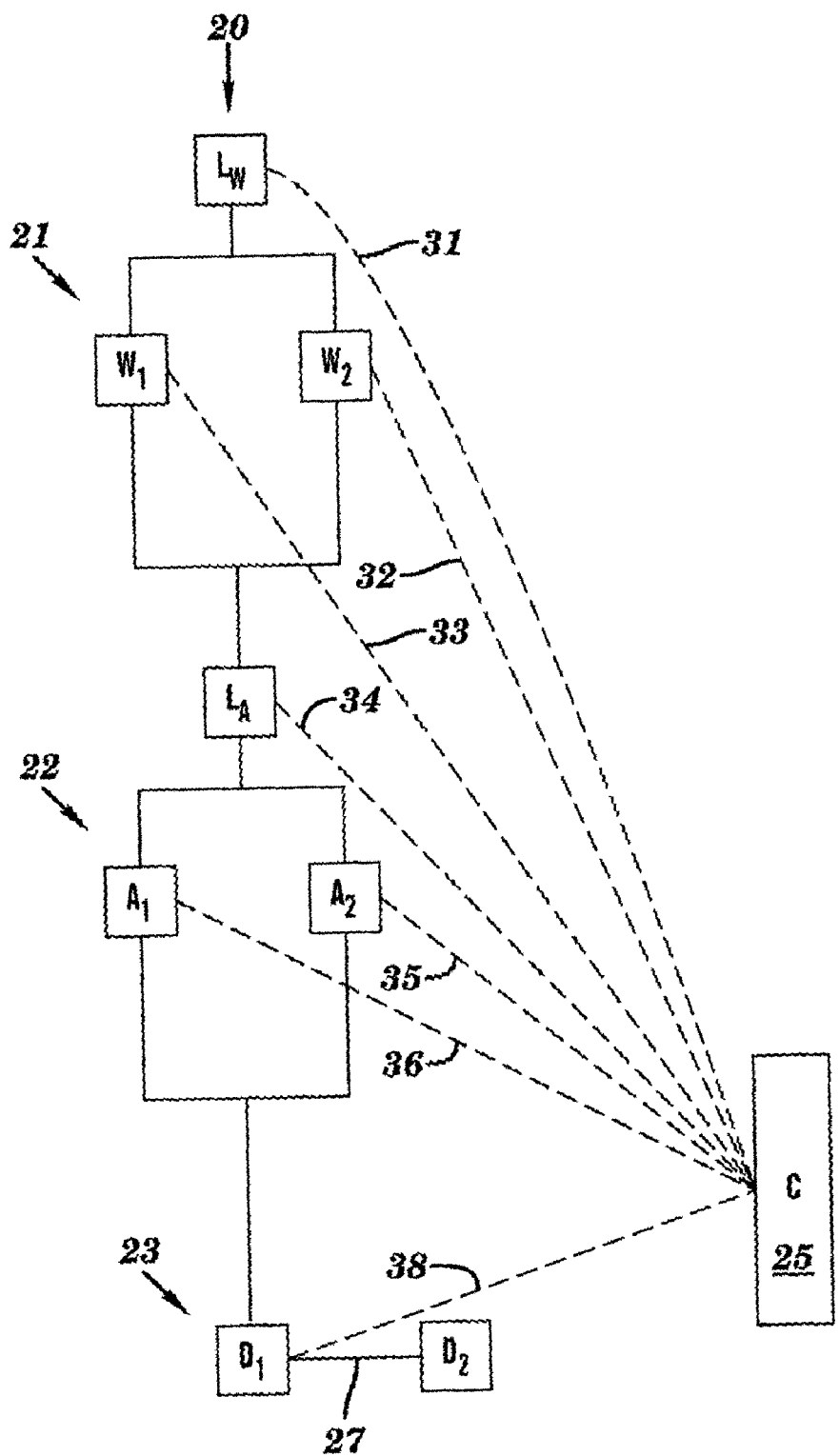
FIG. 3 depicts FIG. 2 after removal of the communication link between the control server and a database server of the database server cluster, in accordance with embodiments of the present invention.

FIG. 3 depicts FIG. 2 after removal of the communication channel 39 between the control server 25 and the database server $D_2$ of the database server cluster 23, in accordance with embodiments of the present invention. As stated supra, the communication channels between the control server 25 and the servers of the system 20 enable the control server 25 to inform a server of a cluster of a non-operational status of a server of another cluster, as will be explained infra in detail in conjunction with FIGS. 16-19. In FIG. 3, with removal of the communication channel 39, communication between the control server 25 and the database server $D_2$ may be indirectly accomplished by communication between the control server 25 and the database server $D_1$ over communication channel 38 in combination with communication between the database servers $D_1$ and $D_2$ over the communication link 27.

Figure 5:
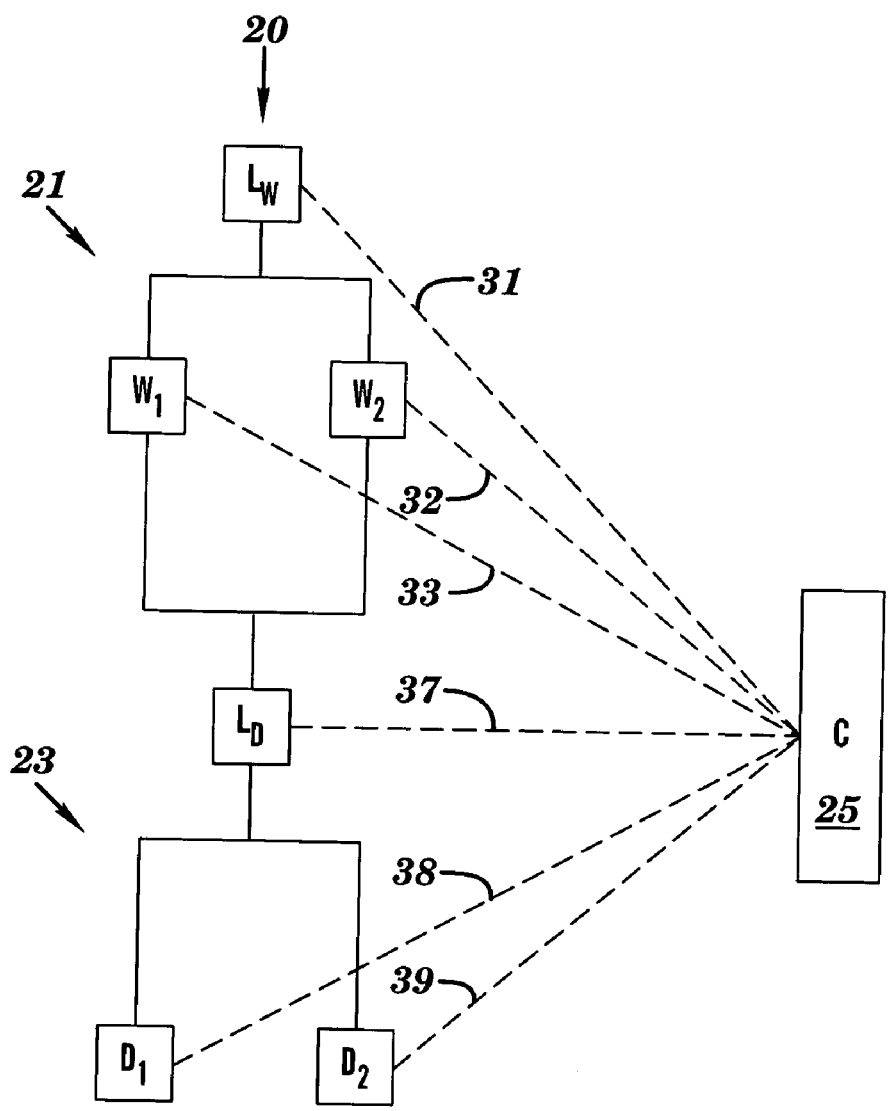
FIG. 5 depicts a system including a control server and a linked network of clusters, the network including a web server cluster coupled to a database server cluster, each cluster including a plurality of servers and a load balancer, the control server linked to each server in each cluster, in accordance with embodiments of the present invention.

FIG. 5 depicts the system 20 of FIG. 1 after removal of the application server cluster 22. Thus the system 20 in FIG. 5 includes the control server 25 and the linked network of that includes the web server cluster 21 directly coupled to a database server cluster 23, in accordance with embodiments of the present invention. The control server 25 is linked to each server in the clusters 21 and 23. The clusters 21 and 23 respectively include the load balancers $L_W$ and $L_D$ as in FIG. 1. With the web server cluster 21 directly coupled to the database server cluster 23, and with no intervening application server cluster, the system 20 in FIG. 5 is suitable for processing applications requiring static web content, but is not suitable for processing applications requiring dynamic web content.

Figure 6:
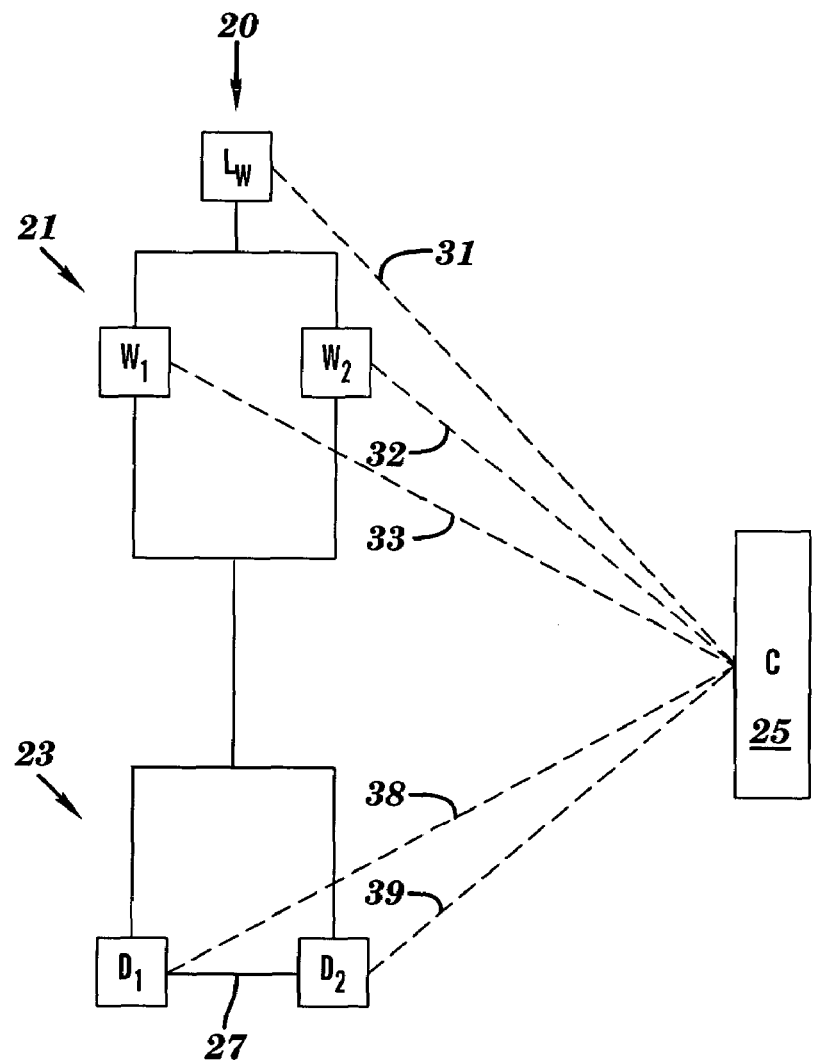
FIG. 6 depicts FIG. 5 after removal of the load balancer of the database server cluster, in accordance with embodiments of the present invention.

FIG. 6 depicts FIG. 5 after removal of the load balancer $L_D$ of the database server cluster 23, in accordance with embodiments of the present invention. FIG. 6 is analogous to FIG. 2, described supra.

Figure 7:
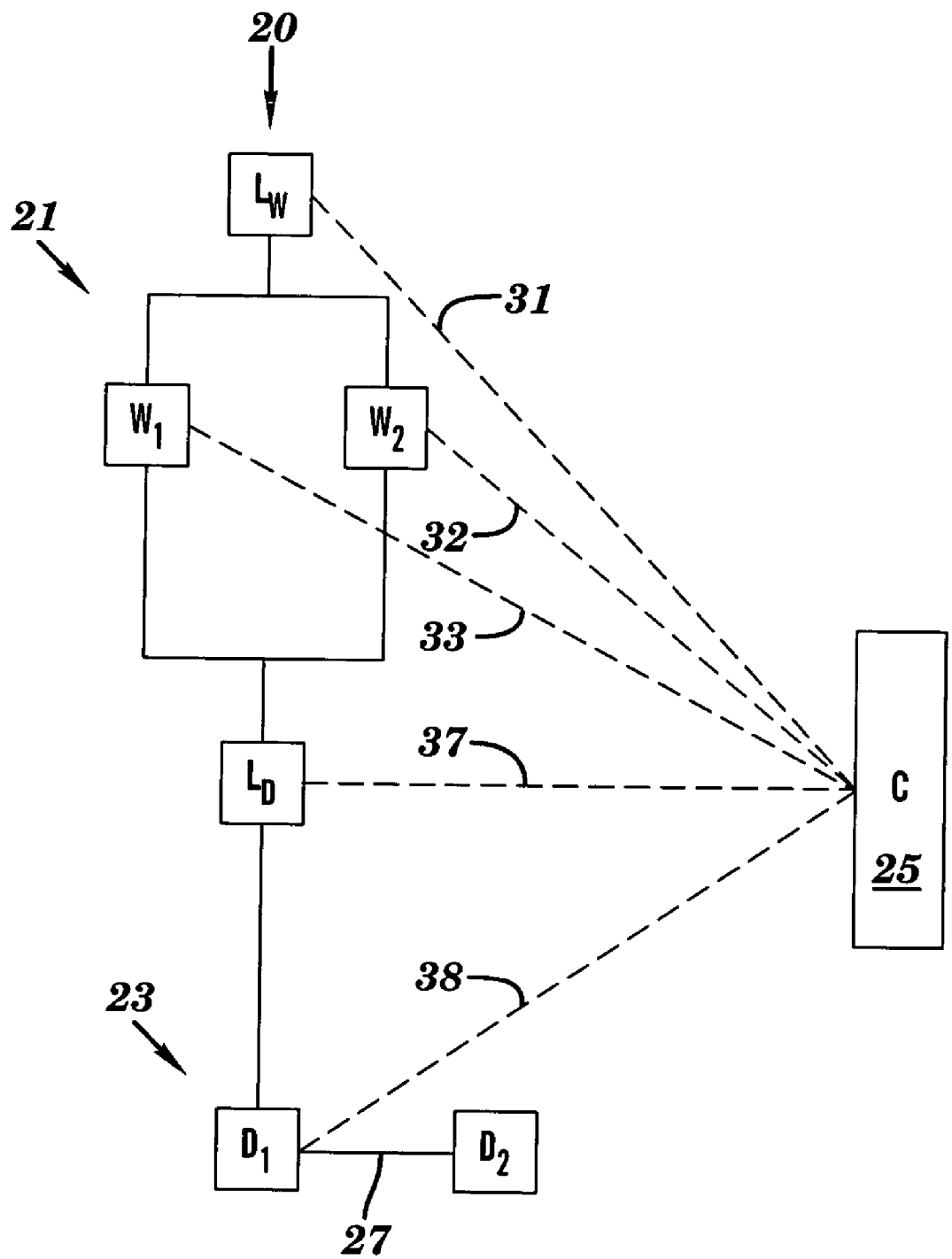
FIG. 7 depicts FIG. 6 after removal of the communication link between the control server and a database server of the database server cluster, in accordance with embodiments of the present invention.

FIG. 7 depicts FIG. 6 after removal of the communication channel 39 between the control server 25 and the database server $D_2$ of the database server cluster 23, in accordance with embodiments of the present invention. FIG. 7 is analogous to FIG. 3, described supra.

Figure 8:
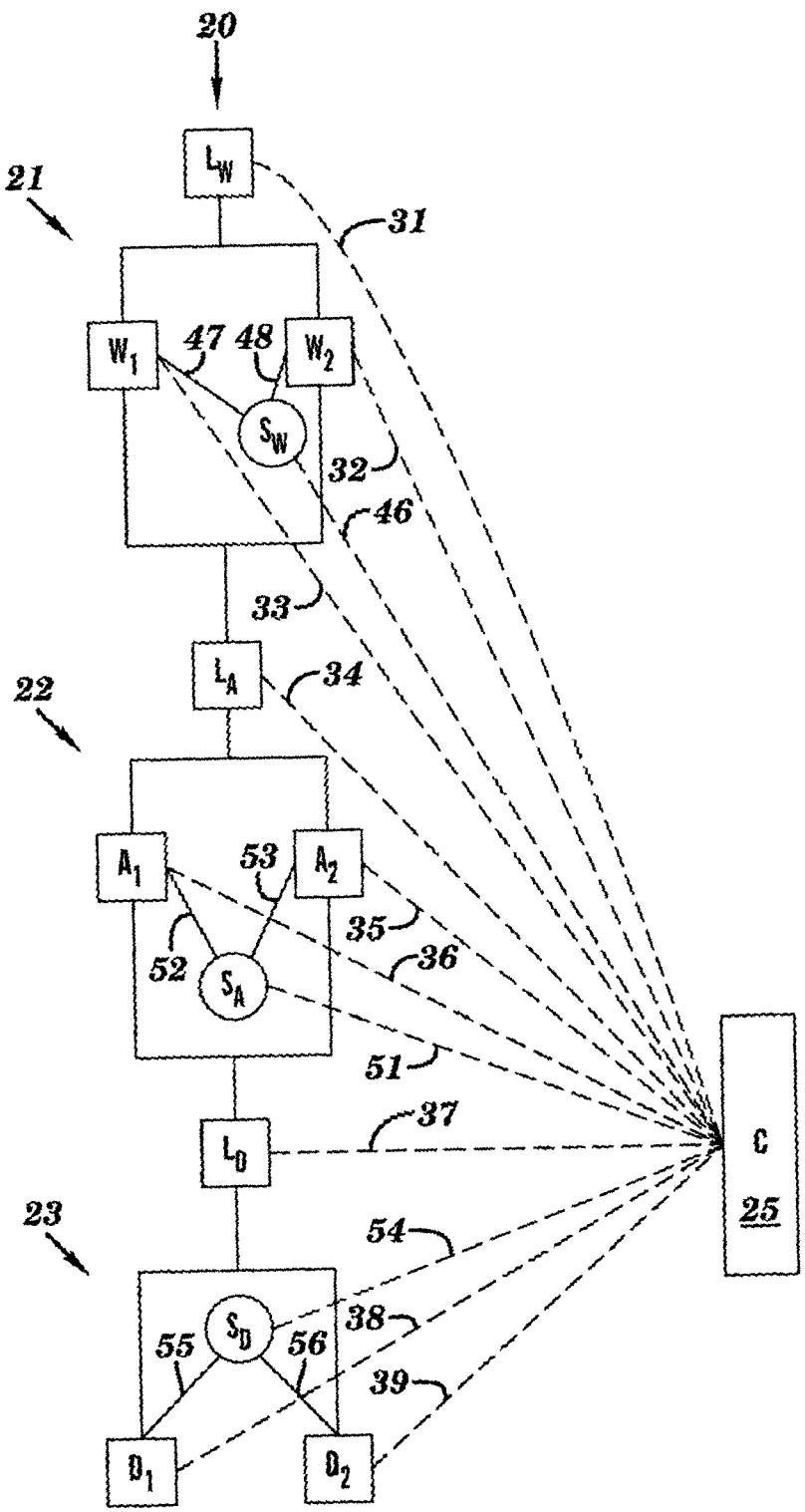
FIG. 8 depicts FIG. 1 after addition of a service node to each cluster, in accordance with embodiments of the present invention.

FIG. 8 depicts FIG. 1 after addition of a service node to each cluster, in accordance with embodiments of the present invention. A service node of a cluster provides support services to the servers in the cluster such as hardware services, software services, help desk services, etc. The service nodes $S_W$, $S_A$, and $S_D$ have been added to the web server cluster 21, the application server cluster 22, and database server cluster 23, respectively. The control server 25 is connected to the service nodes $S_W$, $S_A$, and $S_D$ over the communication channels 46, 51, and 54, respectively. In the web server cluster 21, the service node $S_W$ is connected to the web servers $W_1$ and $W_2$ over the communication paths 47 and 48, respectively. In the application server cluster 22, the service node $S_A$ is connected to the application servers $A_1$ and $A_2$ over the communication paths 52 and 53, respectively. In the database server cluster 23, the service node $S_D$ is connected to the database servers $D_1$ and $D_2$ over the communication paths 55 and 56, respectively.

As an example of how service nodes may be utilized, consider a situation in which the control server 25 has determined that application server $A_1$ of the application server cluster 22 is non-operational. Then the control server 25 may communicate with the service node $S_A$ over the communication channel 51 to direct the service node $S_A$ to make a determination of a cause of the application server $A_1$ being non-operational. Upon making said determination, the service node $S_A$ may facilitate making the application server $A_1$ operational (e.g., by fixing the problem associated with the cause of the application server $A_1$ being non-operational). The service node $S_A$ may utilize the communication paths 52 and/or 53 to help determine the cause of the application server $A_1$ being non-operational and/or facilitate making the application server $A_1$ operational.

While the system 20 of FIGS. 1-4 and 8-9 has been described as comprising three clusters (i.e., clusters 21-23), and while the system 20 of FIGS. 5-7 has been described as comprising two clusters (i.e., clusters 21 and 23), the system of the present invention generally includes a plurality of clusters, and is therefore not limited to only 2 or 3 clusters. Additionally, it is to be understood that a plurality of applications may be executed concurrently on the system 20.

In FIGS. 1-10, the control server 25 functions as a control center of the system 20 and functions to coordinate information exchange across the entire system 20. Accordingly, the control server may utilize a map of all of the direct communication links between between servers in the system 20. Thus, the control server 25 may have access to a global dataset that describes all of said direct communication links. Definitionally, a dataset is any collection of data in accordance with any data format or data organizational format. Examples of datasets include: flat files, tables of data, relational database tables, etc.

Thus, FIG. 11 depicts a global dataset associated with the system of FIG. 1, in accordance with embodiments of the present invention. The global dataset in FIG. 11 is a table listing each communication link (i.e., LINK1, LINK2, ... ) in the system, as well as the servers directly connected to each other by each such communication link. As an example, FIG. 11 lists LINK1 as directly connecting servers $W_1$ and $A_1$, and FIG. 9 shows that LINK1 represents communication link 41. As another example, FIG. 10 lists LINK3 as directly connecting servers $W_2$ and $A_1$, and FIG. 10 shows that LINK3 represents communication link 42.

FIGS. 14 and 15 depict a global dataset associated with the system of FIG. 2 and FIG. 3, respectively, in accordance with embodiments of the present invention. In correspondence with FIG. 2, the global dataset of FIG. 14 shows LINK9 as connecting the database servers $D_1$ and $D_2$; thus LINK9 corresponds to the communication link 27 of FIG. 2. In correspondence with FIG. 3, the global dataset of FIG. 15 shows LINK8 of FIG. 14 as being absent; corresponding to the absence of communication link 39 from FIG. 3 as described supra.

While the control server 25 has access to a global dataset describing the totality of communication links in the system 20, each individual cluster has access to a local dataset that describes only those communication links that directly connect each individual server to the next cluster downstream from each individual server. Accordingly, in relation to FIG. 1, the table in FIG. 12 is a local dataset for the web server cluster 21 of FIG. 1; i.e., the links LINK1, LINK2, LINK3, and LINK4 of FIG. 12 correspond to the communication links between the web servers of cluster 21 and the application servers of cluster 22 of FIG. 1. Similarly, in relation to FIG. 1, the table in FIG. 13 is a local dataset for the application server cluster 22 of FIG. 1; i.e., the links LINK5, LINK6, LINK7, and LINK8 of FIG. 13 correspond to the communication links between the application servers of cluster 22 and the database servers of cluster 23 of FIG. 1.

Figure 16:
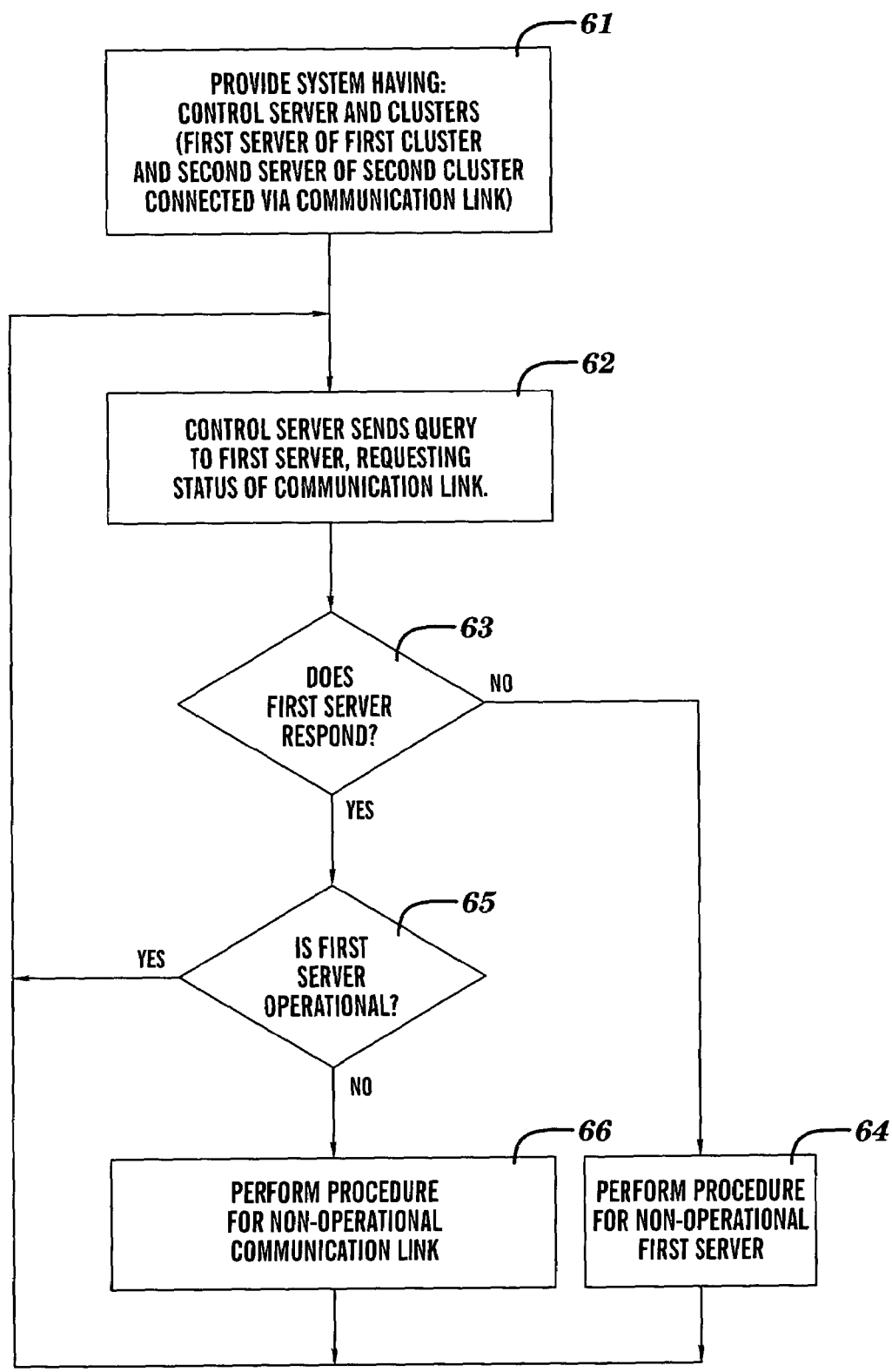
FIG. 16 is a flow chart describing a first method for mitigating non-operational communication links and non-operational servers in the system of FIG. 1, in accordance with embodiments of the present invention.
Figure 17:
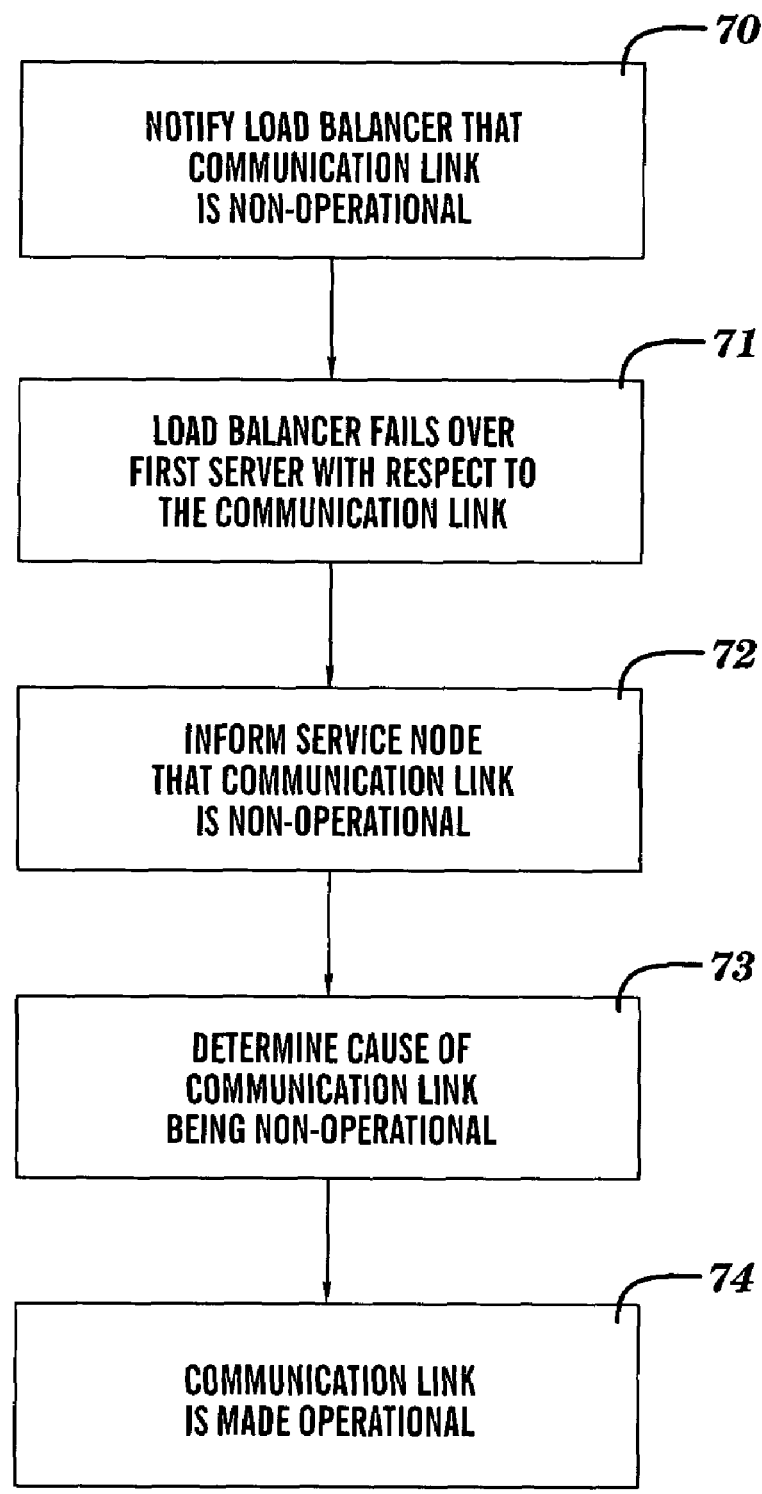
FIG. 17 is a flow chart describing the procedure of FIG. 16 that is responsive to a non-operational communication link, in accordance with embodiments of the present invention.
Figure 18:
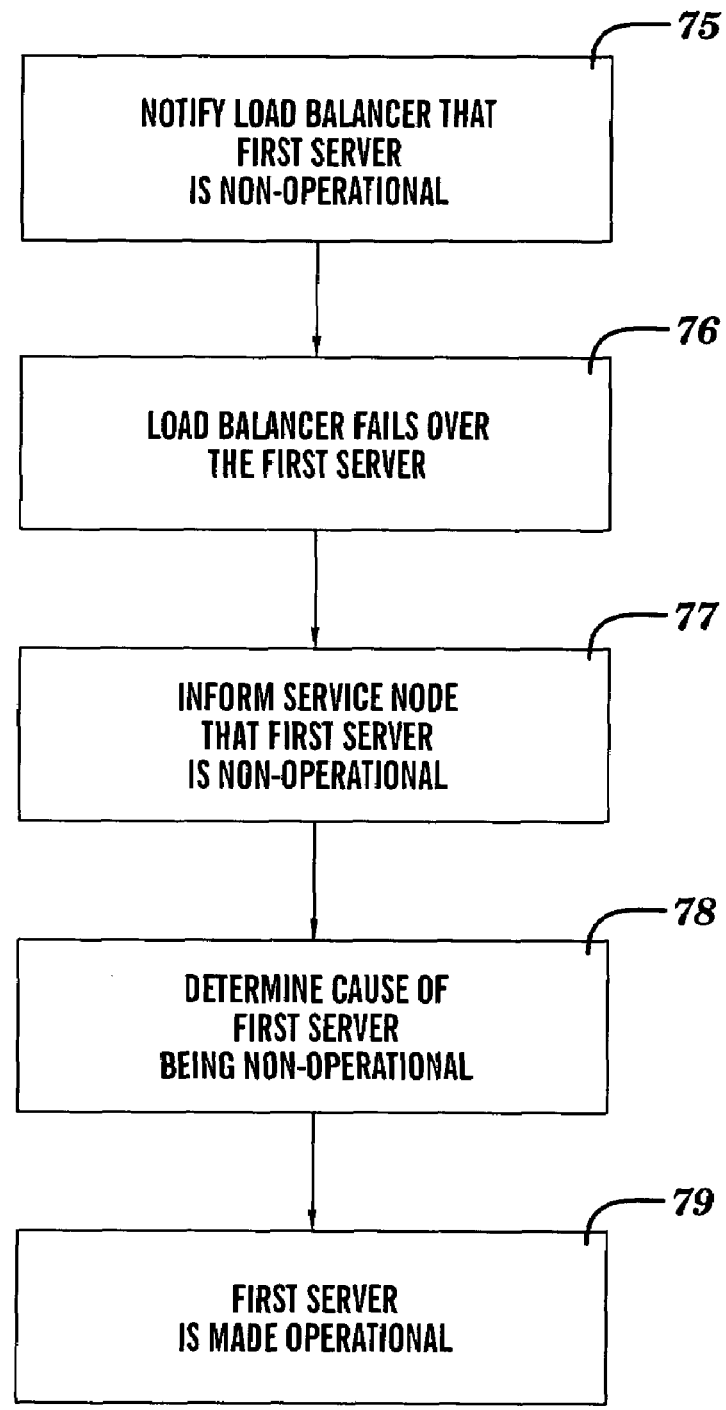
FIG. 18 is a flow chart describing the procedure of FIG. 16 that is responsive to a non-operational server, in accordance with embodiments of the present invention.

FIGS. 16-18 are flow charts describing a first method for optimizing data traffic through the system 20 of FIGS. 1-10 with particular focus on the role of the control server 25, in accordance with embodiments of the present invention.

The flow chart of FIG. 16 includes method steps 61-66. Step 61 provides a system (e.g., the system 20 of FIGS. 1-10) having a control server and a network that comprises a plurality of clusters. Each cluster of the network comprises a plurality of identical servers, and each cluster of the network is directly connected to at least one other cluster of the network. Each pair of clusters directly connected to each other is characterized by each server in a first cluster of the pair of clusters being directly connected to at least one server in a second cluster of the pair of clusters via a communication link. For example using FIG. 9 for illustrative purposes, a first server (e.g., $W_1$) of the first cluster (e.g., cluster 21) may be directly connected to a second server (e.g., $A_1$) of the second cluster (e.g., cluster 22) via a communication link 41. The control server is adapted to monitor an operational status of the communication link. The operational status of the communication link is that the communication link is operational (i.e., working correctly) or non-operational (i.e., working incorrectly or not working). The control server is directly linked to at least one server in each cluster via a communication channel between the control server and the at least one server.

In step 62, the control server is adapted to monitor the operational status of a first communication link between the first server of the first cluster and the second server of the second cluster by sending a query signal to the first server. The query signal requests the first server to send a response signal to the control server indicating the operational status of the communication link.

In step 63, the control server determines whether the first server has responded within a predetermined period of time to the query signal sent in step 62. The predetermined period of time may be selected to be equal to or greater than a minimum period of time in which the first server is reasonably expected to respond to the query signal.

If in step 63 the control server determines that the first server has not so responded within the predetermined period of time, then the control server assumes that the first server is non-operational and, accordingly, a procedure responsive to the first server being non-operational is next performed step 64. Step 64 is described in detail infra in conjunction with FIG. 18. After step 64 is performed, the procedure loops back to step 62, because the first server is adapted to iteratively (e.g., periodically) send the query signal to the first server for monitoring purposes.

If in step 63 the control server determines that the first server has so responded with the expected response signal within the predetermined period of time, then step 65 is next executed. In step 65, the control server examines the response signal from the first server to determine whether the communication link between the first and second servers is operational. If in step 65 the control server determines that the communication link between the first and second servers is not operational, then a procedure responsive to the communication link being non-operational is next performed step 66. Step 66 is described in detail infra in conjunction with FIG. 17. After step 66 is performed, the procedure loops back to step 62, because the first server is adapted to iteratively (e.g., periodically) send the query signal to the first server for monitoring purposes.

Figure 19:
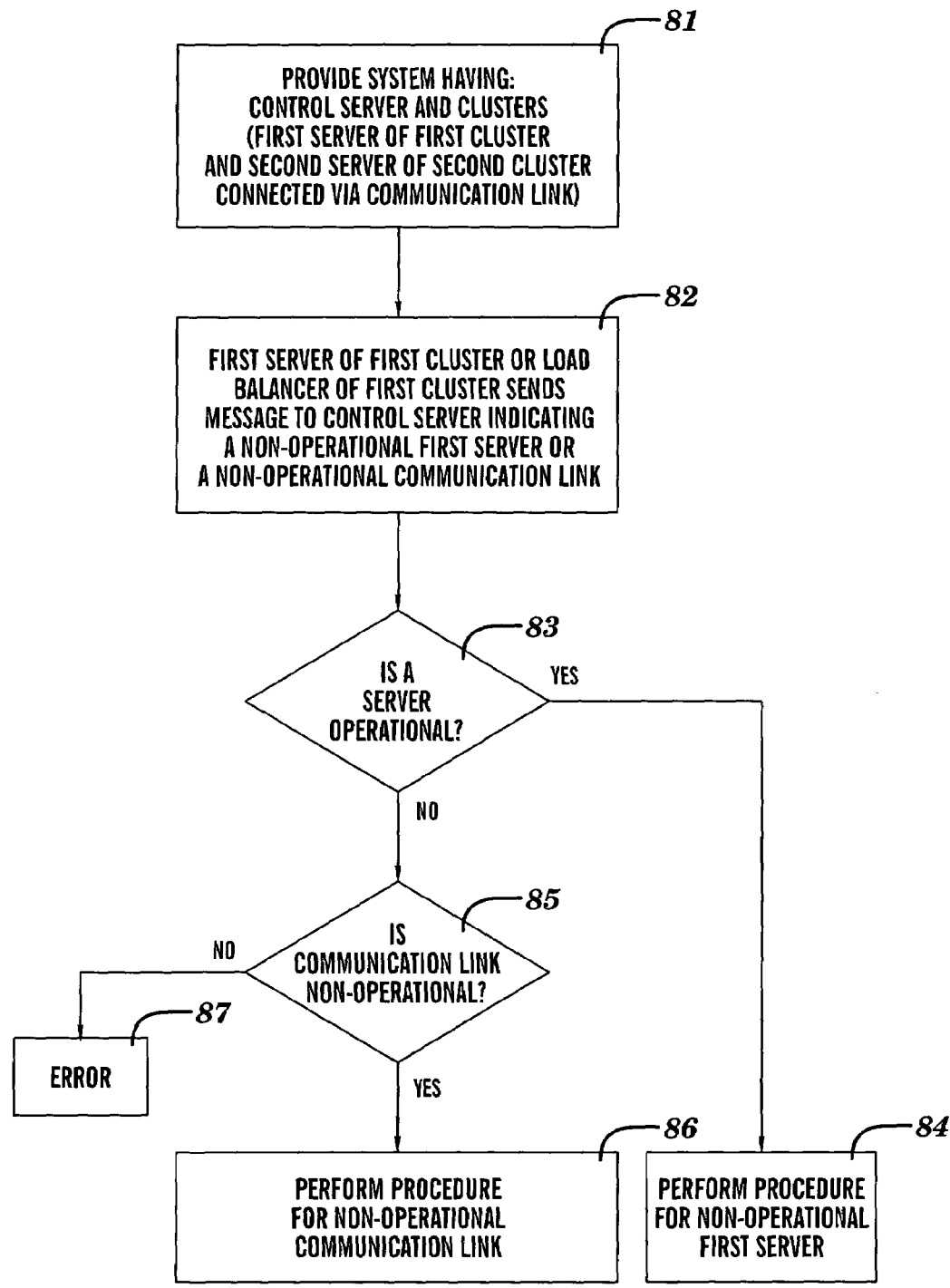
FIG. 19 is a flow chart describing a second method for mitigating non-operational communication links and non-operational servers in the system of FIG. 1, in accordance with embodiments of the present invention.

FIG. 17 is a flow chart describing the procedure of step 66 of FIG. 16 (or the procedure of step 86 of FIG. 19), as being responsive to the non-operational communication link between the first and second servers of FIG. 16 or FIG. 19, in accordance with embodiments of the present invention. The flow chart of FIG. 17 includes method steps 70-74. It is assumed in FIG. 17 that the first cluster has a load balancer.

In step 70, the control server notifies the load balancer of the first cluster that the communication link between the first and second servers is non-operational.

In step 71, upon being notified that said communication link is non-operational, the load balancer is adapted to fail over the first server with respect to the non-operational first communication link. This means that load balancer will disable the first server for handling data traffic that data traffic that is transmitted over the communication link.

In step 72, the control server informs a service node of the first clusters that the communication link between the first and second servers is non-operational.

In step 73, the service node is adapted to make a determination of a cause of the communication link being non-operational. The service node may utilize a communication path between itself and a server of the first cluster to assist in making a determination of a cause of the communication link being non-operational.

In step 74, upon making said determination of a cause of the communication link being non-operational, the service node is adapted to facilitate making the communication link operational (e.g., by fixing the problem associated with the cause of the communication link being non-operational). The service node may utilize a communication path between itself and a server of the first cluster to assist in facilitating making the communication link operational.

While steps 72-74 are shown in FIG. 17 as following steps 70-71, the scope of the present invention includes embodiments in which steps 72-74 are concurrent with steps 70-71 and embodiments in which steps 72-74 precede steps 70-71.

FIG. 18 is a flow chart describing the procedure of step 64 of FIG. 16, (or the procedure of step 84 of FIG. 19) as being responsive to the non-operational first server of FIG. 16 or FIG. 19, in accordance with embodiments of the present invention. The flow chart of FIG. 18 includes method steps 75-79. It is assumed in FIG. 18 that the first cluster has a load balancer.

In step 75, the control server notifies the load balancer of the first cluster that the first server is non-operational.

In step 76, upon being notified that the first server is non-operational, the load balancer is adapted to fail over the first server.

In step 77, the control server inform a service node in the first cluster that the first server is non-operational.

In step 78, the service node is adapted to make a determination of a cause of the first server being non-operational. The service node may utilize a communication path between itself and a server of the first cluster to assist in making a determination of a cause of the first server being non-operational.

In step 79, upon making said determination of a cause of the first server being non-operational, the service node is adapted to facilitate making the first server operational (e.g., by fixing the problem associated with the cause of the first server being non-operational). The service node may utilize a communication path between itself and a server of the first cluster to assist in facilitating making the first server operational.

While steps 77-79 are shown in FIG. 18 as following steps 75-76, the scope of the present invention includes embodiments in which steps 77-79 are concurrent with steps 75-76 and embodiments in which steps 77-79 precede steps 75-76.

FIGS. 19 and 17-18 are flow charts describing a second method for optimizing data traffic through the system 20 of FIGS. 1-10 with particular focus on the role of the control server 25, in accordance with embodiments of the present invention.

The flow chart of FIG. 19 includes method steps 81-87. Step 81 provides a system (e.g., the system 20 of FIGS. 1-10) having a control server and a network that comprises a plurality of clusters. Each cluster of the network comprises a plurality of identical servers, and each cluster of the network is directly connected to at least one other cluster of the network. Each pair of clusters directly connected to each other is characterized by each server in a first cluster of the pair of clusters being directly connected to at least one server in a second cluster of the pair of clusters via a communication link. For example using FIG. 9 for illustrative purposes, a first server (e.g., $W_1$) of the first cluster (e.g., cluster 21) may be directly connected to a second server (e.g., $A_1$) of the second cluster (e.g., cluster 22) via a communication link 41. The control server is adapted to monitor an operational status of the communication link. The control server is directly linked to at least one server in each cluster via a communication channel between the control server and the at least one server.

In step 82, the control server is adapted to receive a message from a first server of the first cluster or from a load balancer of the first cluster, the message indicating that an entity is non-operational. The entity that is non-operational is a server of the first cluster or a communication link between the first server of the first cluster and a second server of the second cluster.

In step 83, the control server analyzes the message received from the entity to determine whether a server of the first cluster is non-operational.

If in step 83 the control server determines from the message that a server of the first cluster is non-operational, then the procedure responsive to the first server being non-operational is next performed step 84. Step 84 has been described in detail supra in conjunction with FIG. 18. After step 84 is performed, the procedure may branch to step 62 of FIG. 16, because the first server is adapted to iteratively (e.g., periodically) send the query signal to the first server for monitoring purposes.

If in step 83 the control server does not determine from the message that a server of the first cluster is non-operational, then step 85 is next executed. In step 85, the control server determines whether the communication link is operational. If in step 85 the control server determines that the communication link is non-operational, then an error has occurred as noted in step 87, since step 82 assumes that the message received by the control server specifies that an entity (i.e., a server of the first cluster or said communication link) is non-operational. If in step 85 the control server determines that the communication link is non-operational, then a procedure responsive to the communication link being non-operational is next performed step 86. Step 86 has been described in detail supra in conjunction with FIG. 17. After step 86 is performed, the procedure may branch to step 62 of FIG. 16, because the first server is adapted to iteratively (e.g., periodically) send the query signal to the first server for monitoring purposes.

As explained supra, the system 20 of the present invention generally includes a plurality of clusters and is not limited to 2 or 3 clusters. Additionally, a plurality of applications may be executed concurrently on the system 20. The methods described supra in conjunction with FIGS. 16-19 thus facilitate an efficient processing by the system 20 of one of more concurrent applications. Thus, the system 20 provides a high availability processing environment to applications, since the system 20 increases, and perhaps maximizes in some cases, the availability to applications of the servers therein for processing purposes for entire applications with respect to all servers needed to process the entire applications.

Figure 20:
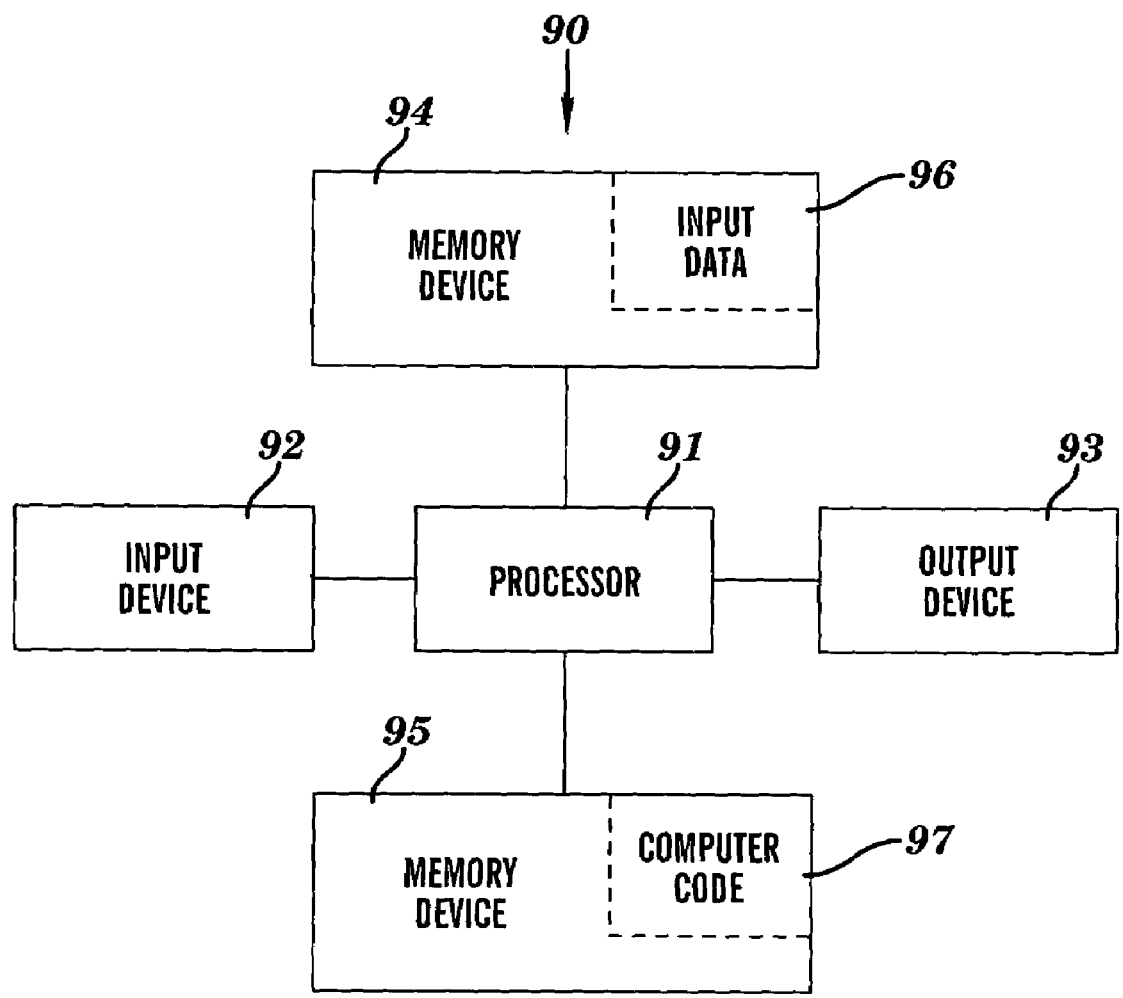
FIG. 20 depicts a computer system used for maintaining a high availability processing environment, in accordance with embodiments of the present invention.

FIG. 20 illustrates a computer system 90 used for maintaining a high availability processing environment, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 may include an algorithm utilized by the control server 25 of FIGS. 1-10 for maintaining a high availability processing environment in accordance with the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 20) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 20 shows the computer system 90 as a particular configuration of hardware and software, any configuration of hardware and software, as would be known to a person of ordinary skill in the art, may be utilized for the purposes stated supra in conjunction with the particular computer system 90 of FIG. 20. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for maintaining a high availability processing environment, said method comprising:

providing a network having a plurality of clusters, each cluster of the network comprising a plurality of identical servers, each cluster of the network being directly connected to at least one other cluster of the network, wherein each pair of clusters directly connected to each other is characterized by each server in a first cluster of the pair of clusters being directly connected to at least one server in a second cluster of the pair of clusters via a communication link; and providing a control server adapted to monitor an operational status of said communication link, said operational status of the communication link being that said communication link is operational or non-operational, said control server being directly linked to each server of at least two servers in each cluster via a separate communication channel between the control server and each server of the at least two servers in each cluster, wherein there is no coinciding path segment among the separate communication channels between the control server and each server of the at least two servers in each cluster.

2. The method of claim 1, said method further comprising:

providing a global dataset that includes an identification of each communication link in the network, said global dataset being accessible to the control server; and providing a local dataset specific to each cluster of the plurality of clusters, said local dataset including an identification of each communication link in the network to which the servers of said each cluster is coupled for flow of data out of the cluster, said local dataset being accessible to the servers of said each cluster.

3. The method of claim 1, wherein each cluster of the plurality of clusters has a load balancer that is specific to each cluster and is independent of the load balancer of each other cluster, and wherein the method further comprises distributing data traffic uniformly among the servers comprised by each cluster, said distributing for each cluster being performed by the load balancer of each cluster.

4. The method of claim 1, wherein the control server is adapted to receive a message from a first server of the first cluster or from a load balancer of the first cluster, said message indicating that an entity is non-operational, said entity being selected from the group consisting of a server of the first cluster and a communication link between the first server of the first cluster and a second server of the second cluster.

5. The method of claim 4, wherein upon the control server receiving the message the method further comprises: informing a service node of the first cluster that the entity is non-operational, said informing being performed by the control server.

6. The method of claim 1, wherein the control server is directly linked to a first server of the first cluster and is not directly linked to a second server of the first cluster, wherein the first server is directly connected to the second server, said method further comprising monitoring the operational status of the second server via direct communication with the first server coupled with direct communication between the first server and the second server, said monitoring being performed by the control server, said operational status of the second server being that said second server is operational or non-operational.

7. The method of claim 1, wherein at least one cluster of the plurality of clusters does not have a load balancer adapted to distribute data traffic uniformly among the servers comprised by the first cluster.

8. The method of claim 1, wherein the plurality of clusters includes a web cluster of web servers, an application cluster of application servers, and a database cluster of database servers, the web cluster being directly connected to the application cluster, the application cluster being directly connected to the database cluster, the web cluster adapted to communicate with the database cluster by way of the application cluster functioning as an intermediary cluster between the web cluster and the database cluster.

9. The method of claim 8, wherein the web cluster has a load balancer adapted to distribute data traffic uniformly among the web servers comprised by the web cluster, wherein the application cluster has a load balancer adapted to distribute data traffic uniformly among the application servers comprised by the application cluster, and wherein the database cluster has a load balancer adapted to distribute data traffic uniformly among the database servers comprised by the database cluster.

10. The method of claim 8, wherein the web cluster has a load balancer adapted to distribute data traffic uniformly among the web servers comprised by the web cluster, wherein the application cluster has a load balancer adapted to distribute data traffic uniformly among the application servers comprised by the application cluster, and wherein the database cluster does not have a load balancer adapted to distribute data traffic uniformly among the database servers comprised by the database cluster.

11. The method of claim 1, wherein the plurality of clusters includes a web cluster of web servers and a database cluster of database servers, the web cluster being directly connected to the database cluster, the web cluster adapted to directly communicate with the database cluster.

12. The method of claim 11, wherein the web cluster has a load balancer adapted to distribute data traffic uniformly among the web servers comprised by the web cluster, and wherein the database cluster has a load balancer adapted to distribute data traffic uniformly among the database servers comprised by the database cluster.

13. The method of claim 11, wherein the web cluster has a load balancer adapted to distribute data traffic uniformly among the web servers comprised by the web cluster, and wherein the database cluster does not have a load balancer adapted to distribute data traffic uniformly among the database servers comprised by the database cluster.

14. The method of claim 1, wherein the control server is the only control server adapted to monitor the operational status of said communication link and is the only control server that is directly linked to at least two servers in each cluster via the communication channel between the control server and the at least two servers in each cluster.

15. The method of claim 1, wherein the plurality of identical servers in each cluster consists of all identical servers in each cluster, and wherein the at least two servers in each cluster consists of the plurality of identical servers in each cluster.

16. The method of claim 1, wherein each cluster has an associated load balancer adapted to distribute data traffic uniformly among the servers comprised by each cluster, wherein the control server is linked to each load balancer via a separate link path between the control server and each load balancer, wherein all said separate link paths concurrently exist.

17. The method of claim 16, wherein the plurality of clusters consist of N clusters such that N is at least 3, wherein the N clusters are denoted as clusters $C_1, C_2, \ldots, C_N$ having the associated load balancers $L_1, L_2, \ldots, L_N$, respectively, and wherein the N clusters and associated load balancers are serially linked together in a serial order of:

$L_1$-$C_1$-$L_2$-$C_2$- . . . -$L_N$-$C_N$.

18. The method of claim 17, wherein the control server is denoted as C and is linked to the clusters $C_1, C_2, \ldots, C_N$ by links $L_{C1}, L_{C2}, \ldots, L_{CN}$, respectively, and to the associated load balancers $L_1, L_2, \ldots, L_N$ by links $L_{L1}, L_{L2}, \ldots, L_{LN}$, respectively, as follows:

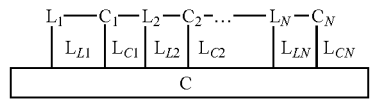

wherein each link $L_{Cn}$ between the control server C and the cluster $C_n$ represents the separate communication channels between the control server C and each server of the at least two servers in each cluster $C_n$ for n=1, 2, . . . , N.

19. A method for maintaining a high availability processing environment, said method comprising:

providing a network having a plurality of clusters, each cluster of the network comprising a plurality of identical servers, each cluster of the network being directly connected to at least one other cluster of the network, wherein each pair of clusters directly connected to each other is characterized by each server in a first cluster of the pair of clusters being directly connected to at least one server in a second cluster of the pair of clusters via a communication link;

providing a control server adapted to monitor an operational status of said communication link, said operational status of the communication link being that said communication link is operational or non-operational, said control server being directly linked to each server of at least two servers in each cluster via a separate communication channel between the control server and each server of the at least two servers in each cluster, wherein there is no coinciding path segment among the separate communication channels between the control server and each server of the at least two servers in each cluster; and monitoring an operational status of a first communication link between a first server of the first cluster and a second server of the second cluster, said monitoring being performed by the control server, said monitoring including sending a query signal to the first server, said query signal requesting the first server to send a response signal to the control server indicating the status of the first communication link, said operational status of the first communication link being that said first communication link is operational or non-operational.

20. The method of claim 19, wherein the first server is adapted to respond to the query signal by sending a prompt signal over the first communication link to the second server, said prompt signal prompting the second server to send a return signal to the first server over the first communication link, said return signal or absence thereof being indicative of the operational status of the first communication link.

21. The method of claim 19, wherein the first cluster has a load balancer adapted to distribute data traffic uniformly among the servers comprised by the first cluster, and wherein upon the control server receiving the response signal from the first server such that the response signal indicates that the first communication link is non-operational the method further comprises: notifying the load balancer that the first communication link is non-operational, said notifying being performed by the control server.

22. The method of claim 19, wherein upon the load balancer being notified that the first communication link is non-operational the method further comprises: failing over the first server with respect to the first communication link, said failing over being performed by the load balancer.

23. The method of claim 19, wherein upon the control server receiving the response signal from the first server such that the response signal indicates that the first communication link is non-operational the method further comprises: informing a service node in the first cluster that the first communication link is non-operational, said informing being performed by the control server.

24. The method of claim 23, wherein upon the service node being informed that the first communication link is non-operational the method further comprises: making a determination of a cause of the first communication link being non-operational, said making a determination being performed by the service node.

25. The method of claim 24, wherein upon the service node making said determination of said cause the method further comprises: facilitating making the first communication link operational, said facilitating being performed by the service node.

26. The method of claim 19, wherein the first cluster has a load balancer adapted to distribute data traffic uniformly among the servers comprised by the first cluster, and wherein upon the control server not receiving the response signal from the first server within a predetermined period of time after sending the query signal to the first server the method further comprises: making a determination that the first server is non-operational and notifying the load balancer that the first server is non-operational, said making said determination that the first server is non-operational and said notifying being performed by the control server.

27. The method of claim 26, wherein upon load balancer being notified that the first server is non-operational the method further comprises: failing over the first server, said failing over being performed by the load balancer.

28. The method of claim 26, wherein upon the control server not receiving the response signal from the first server within a predetermined period of time after sending the query signal to the first server the method further comprises: informing a service node in the first cluster that the first server is non-operational, said informing being performed by the control server.

29. The method of claim 28, wherein upon the service node being informed that the first server is non-operational the method further comprises: making a determination of a cause of the first server being non-operational, said making said determination of said cause being performed by the service node.

30. The method of claim 29, wherein upon the service node making said determination of said cause the method further comprises: facilitating making the first server operational, said facilitating being performed by the service node.

31. The method of claim 19, wherein each cluster has an associated load balancer adapted to distribute data traffic uniformly among the servers comprised by each cluster, wherein the control server is linked to each load balancer via a separate link path between the control server and each load balancer, wherein all said separate link paths concurrently exist.

32. The method of claim 31, wherein the plurality of clusters consist of N clusters such that N is at least 3, wherein the N clusters are denoted as clusters $C_1, C_2, \ldots, C_N$ having the associated load balancers $L_1, L_2, \ldots, L_N$, respectively, and wherein the N clusters and associated load balancers are serially linked together in a serial order of:

$L_1$-$C_1$-$L_2$-$C_2$-$\ldots$-$L_N$-$C_N$.

33. The method of claim 32, wherein the control server is denoted as C and is linked to the clusters $C_1, C_2, \ldots, C_N$ by links $L_{C1}, L_{C2}, \ldots, L_{CN}$, respectively, and to the associated load balancers $L_1, L_2, \ldots, L_N$ by links $L_{L1}, L_{L2}, \ldots, L_{LN}$, respectively, as follows:

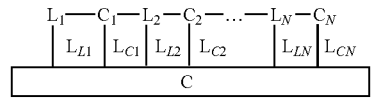

wherein each link $L_{C_n}$ between the control server C and the cluster $C_n$ represents the separate communication channels between the control server C and each server of the at least two servers in each cluster $C_n$ for n=1, 2, . . . , N.

* * * * *